June 19, 1945.   J. G. VINCENT   2,378,452
INTERNAL-COMBUSTION ENGINE
Filed April 19, 1943   2 Sheets-Sheet 2
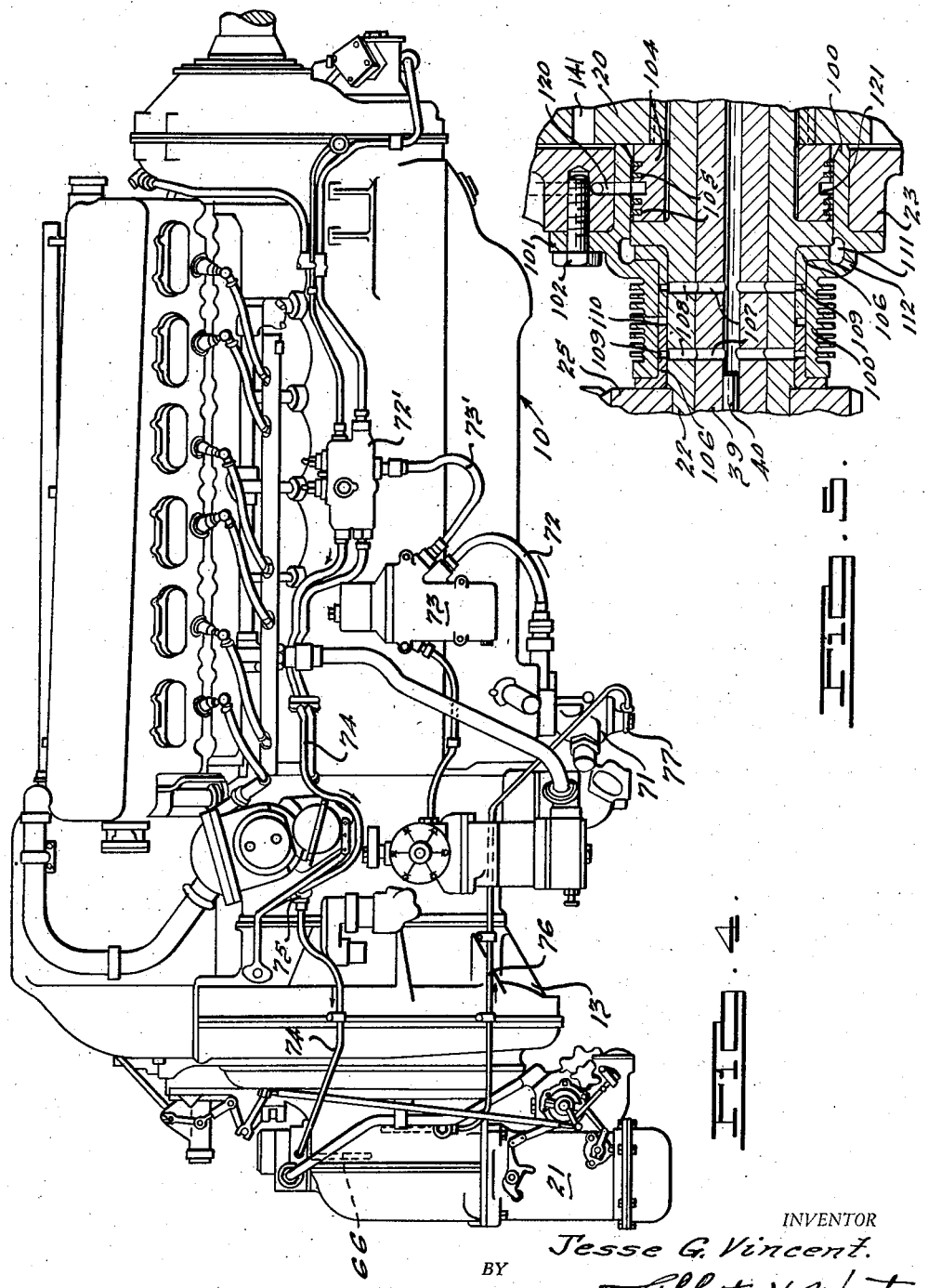
INVENTOR
Jesse G. Vincent.
BY
Tibbetts & Hart
ATTORNEYS.

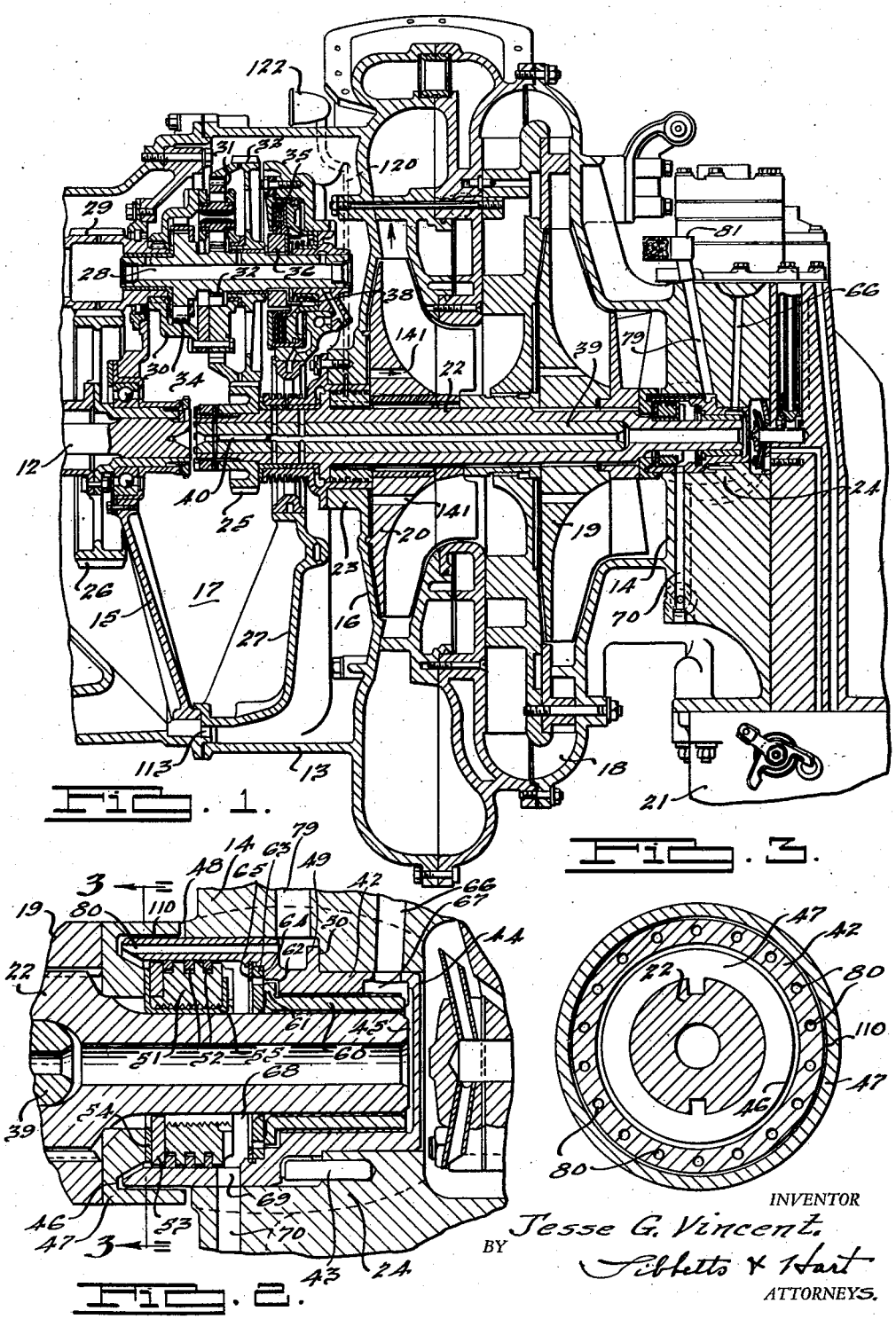

Patented June 19, 1945

2,378,452

UNITED STATES PATENT OFFICE 2,378,452

INTERNAL-COMBUSTION ENGINE

Jesse G. Vincent, Grosse Pointe Park, Mich., assignor to Packard Motor Car Company, Detroit, Mich., a corporation of Michigan Application April 19, 1943, Serial No. 483,668

14 Claims. (Cl. 230—132)

This invention relates to superchargers for engines.

Engine superchargers usually have a casing with a chamber therein through which the fuel is moved by impeller means. The pressure in the inlet portion of the chamber is below atmospheric pressure, while at the outlet portion of the chamber, the pressure is momentarily below atmospheric pressure when starting the engine but the pressure is above atmospheric pressure after the engine is in normal operation. As the drive shaft for the impeller means extends through the passageway in the casing, considerable difficulty is encountered in properly sealing the shaft bearings adjacent the passageway so that lubricant will not be sucked into the fuel under sub-atmospheric pressure conditions or blown out of a bearing under pressure conditions above atmospheric pressure.

It is an object of this invention to control pressure conditions adjacent the bearings for the impeller shaft of an engine supercharger device to stabilize lubrication of the bearings.

Another object of the invention is to stabilize pressure at the lubricated portions of a supercharger impeller shaft so that oil will not be drawn away from the lubricating system at such shaft portions.

Another object of the invention is to provide for the adequate lubrication of spaced bearings for a high speed supercharger impeller shaft by a system in which lubricant passes through the shaft without sludging.

Other objects of the invention will appear from the following description taken in connection with the drawings, which form a part of this specification, in which:

Fig. 1 is a vertical sectional view longitudinally of an engine supercharger device incorporating the invention;

Fig. 2 is an enlarged sectional view of a portion of the device shown in Fig. 1 showing one of the shaft bearings and the lubricating system associated therewith;

Fig. 3 is a sectional view of the device taken on line 3—3 of Fig. 2;

Fig. 4 is a side elevational view of an engine having the invention incorporated therewith;

Fig. 5 is a view similar to Fig. 2 showing another of the shaft bearings with the lubricating system associated therewith.

Referring now to the drawings by characters of reference, a conventional internal combustion engine 10 has a crankshaft with a flexible shaft extension 12 extending into a casing 13 housing a supercharger device and multiple speed drive mechanism for the supercharger device. The casing is divided interiorly by three transversely extending wall structures 14, 15 and 16 to provide a chamber 17 for drive gearing and a fuel chamber 18 containing impeller means 19 and 20. A fuel feeding device 21, such as a conventional carburetor, is secured to wall structure 14 and fuel passes through such wall to the inlet portion of the fuel chamber. The outlet portion of such chamber lies adjacent wall structure 16 and communicates with fuel manifolding leading to the engine cylinders.

The supercharger device is of the two-stage type and the impeller means are fixed on drive shaft 22 extending through the fuel chamber. Wall structure 16 has a flanged portion 23 and wall structure 14 has a hub 24 forming journals for supporting the impeller drive shaft. A portion of shaft 22 lies in the gearing chamber 17 and has a gear 25 fixed thereon. The crankshaft extension 12 has a drive gear 26 fixed thereon and between gears 25 and 26 is arranged sets of drive mechanisms including planetary gearing controllable to selectively drive the impellers in either one of two speed ratios, both several times greater than the crankshaft speed.

Only one of the sets of drive mechanisms between gears 25 and 26 is shown, but the several sets are alike and are similarly controlled. Casing wall 15 supports a hollow gear 29 that meshes with gear 26 and a shaft 28 is mounted in gear 29 and wall 27. Cage 30 is mounted on shaft 28 splined to gear 29. The cage carries pinions 31 meshing with sun gear 32 fixed on shaft 28 and with ring gear 33 meshing with gear 25. Between the cage and the shaft 28 is arranged a one-way overrunning roller clutch device 34 that is normally effective to establish the lower speed drive through the drive mechanism.

A brake is carried by wall 27 for holding shaft 28 to cause the drive through the drive mechanism to be stepped up due to holding the sun gear stationary. Plates 35 are alternately engaged with wall 27 and hub 36 fixed on the sun gear shaft and are engaged or released by plate 37 normally moved into disengaged position by spring 38. The plate 37 is moved to brake engaging position by fluid under pressure, which can be the oil in the engine lubricating system, having any conventional control.

The drive shaft 22 is made of suitable metal, such as steel, in the form of a sleeve having multiple external diameters and a bore of two diameters. A hollow filler member 39 is pressed into the larger bore portion of the shaft and is preferably formed of relatively light metal, such as aluminum.

The end of this filler member, adjacent the smaller bore portion of the shaft, is open and the other end of the filler member bore is closed by a plug 40. This combination of the shaft 22 and the filler member provides a strong, lightweight drive structure. The filler member also materially reduces the diameter of the interior passage through which lubricant flows and thus the movement of the oil radially is materially restricted so that sludging is eliminated even though the shaft is rotated at extremely high speeds.

The supporting bearing structure for the smaller diameter end of the shaft 22 is best shown in Fig. 2. This end portion of shaft 22 extends into the journal hub 24 of wall 14 and into a two diameter bushing 42 pressed into the hub and secured against rotation by pin 43. The smaller diameter portion of the bushing is closed by end wall 44 and the open end of shaft 22 is spaced from such wall to form an oil feeding chamber 45. The larger portion of the bushing has an open end extending beyond the hub and projecting into a chamber 46 in a ring member 47 spaced from the hub to form an annular space 48 open to the interior of chamber 18. The axial disposition of the bushing in one direction is determined by flange 49 engaging shoulder 50 in the hub. A member 51 is screwed on the shaft within the larger diameter portion of the bushing and carries sealing rings 52 that engage with the bushing. A spacer member 53 extends around one end of member 51 and lock washer 53 lies between one end of such member and ring member 47. Tongue 55 on the washer extends through a slot in the threaded portion of the shaft and is bent up against the end of the member 51 nearest the small diameter portion of the bushing. After the impeller 19 is positioned on shaft 22, the member 51 is screwed on the shaft to hold the ring member 47 against the impeller means 19 and the washer tongue is then bent up to secure the parts in such position.

A floating bearing sleeve 60 is positioned between the bushing and the smaller diameter portion of the shaft 22. Flange 61 at one end of the sleeve extends into a space between interior shoulder 62 of the bushing and a thrust ring member 63 secured against another interior shoulder 64 in the bushing by washer 65. The floating sleeve is free axially but is limited in axial movement by the thrust member and shoulder 62. Oil from a pressure lubricating system flows into chamber 45 through a passage 66 in wall 14 and a radial opening 67 in the bushing, such opening being large enough at the outlet end to overlie the end of the floating sleeve and insure freedom of oil flow to the chamber 45. The floating sleeve has a loose fit with the shaft and bushing so that oil can flow therebetween, and oil will also flow from the chamber 45 through the bores in the reduced portion of the shaft 22 and in the filler member.

The thrust ring 63 and member 51 are spaced in an axial direction and form a chamber 68 into which oil from around the bearing sleeve will flow. Oil from this chamber will work its way along the interior surface of the bushing engaged by rings 52 for the purpose of lubrication. The bushing has an outlet opening 69 communicating with chamber 68 and with passage 70 in wall 14. Referring now to Fig. 4, the pump 71 for the engine lubricating system has an outlet conduit 72 leading to filter 73. Conduit 73' leads from the filter to valve 72' and conduit 74 leads from the valve to passage 66 and branches off at 75 to suitable controlled passage means leading to the planetary gearing brakes. Salvage pump 77 is arranged to draw oil from chamber 68 through passage 70 and conduit 76 back into the main lubricating system. Pump 71 draws in oil draining into the engine crankcase sump and circulates it through the lubricating system.

The chamber around the open end of the bushing communicates with the interior of the inlet portion of the fuel chamber and the action of the impeller will cause a pressure drop in the inlet portion of the chamber sufficient to draw oil past the bearing rings and into the fuel. As this condition is most undesirable, provision is made for neutralizing the influence of this reduced pressure on the pressure in chamber 46, and to this end such chamber is placed in communication with atmosphere exteriorly of the engine. Wall 14 has a passage 79 therein that is open to the bushing at the junction of the two diameter portions thereof and the larger diameter portion of the bushing has a plurality of passages 80 extending in an axial direction through which air from passage 79 can flow to chamber 46 and space 48. Air pressure in chamber 46 will be substantially the same as in oil outlet chamber 68 and no force will be developed tending to draw oil past the sealing rings 52 into the fuel chamber. An inlet member 81 is fixed to the engine and connects with passage 79. Such air inlet member is provided with conventional filter means therein so that air passing therethrough to the fuel in the supercharger device will be clean. The ring member 47 extends over the open end portion of the bushing and the space 140 between the member and the bushing provides a restricted connection between chamber 46 and outlet space 48 for regulating the volume of air drawn through the chamber.

Flange 23 in wall 16 carries a bearing structure for the shaft 22. A two diameter bushing 100 has a flange 101 that is secured to wall 16 by bolts 102. The larger diameter portion of the bushing is pressed into the wall flange 23 and the smaller diameter portion of the bushing lies in the gearing chamber 17. Shaft 22 extends through this bushing and has a thrust flange 103 in the larger diameter portion of the bushing. Between this flange and impeller 20, a member 104 is splined to shaft 22 and sealing rings 105 are carried thereby and engage the inner wall of the bushing.

A floating bearing structure is arranged between the shaft 22 and the smaller diameter portion of the bushing, such structure consisting, in this instance, of a pair of spaced flanged sleeves 106. The filler member 39 and shaft 22 have radially extending openings 107 and 108 respectively through which oil can pass from the bore of the filler member to passages 109 in the sleeves aligning therewith. The smaller diameter portion of the bushing has an oil outlet opening 110 registering with the space between the bearing sleeves. Oil can work along one of the sleeves to chamber 111 and from there to the bushing surface engaged by some of the rings 105. The chamber has an opening 112 through which accumulated oil drains into the chamber 17 and from there the oil drains back to the engine sump through passage 113.

Member 104 and bushing 100 are open at one end to the outlet portion of the fuel chamber 18 and when the engine is being started there is a pressure drop in such portion due to the movement of fuel through the supercharger device that will draw oil past the rings 105 into the fuel chamber. To neutralize the effect of this pressure reduction, means is provided for introducing air from outside the casing to the bearing structure. Wall 16 has a passage 120 therein communicating with an annular groove 121 in the periphery of the member 105 located between two of the sealing rings. An air inlet device 122 is fixed to the engine in communication with passage 120 and can have a filter means therein so that air drawn therethrough into chamber 18 will be clean. As air from passage 120 at atmospheric pressure is drawn into groove 121, it will prevent a pressure drop in chamber 111, thus preventing the displacement of oil from the bearing into the fuel chamber 18.

When the engine is in normal operation after the initial starting period, the impellers will be driven at a speed creating pressure in the outlet portion of chamber 18 greater than atmospheric pressure and the effect of this pressure on the bearing in journal 23 is relieved somewhat by passages 141 in impeller 20. However, when the pressure at the sealing rings 105 is above atmospheric pressure, relief is afforded through groove 121, passage 120 and member 122 so that pressure on the lubricant in chamber 111 remains normal. Thus the duct means at journal 23 serves to maintain normal pressure in chamber 111 so that lubricant will not be diverted from its intended course of flow.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In an engine supercharger device, a casing having a chamber through which fuel flows to the engine, said casing having a wall with a journal therethrough, a bushing in the journal, a drive shaft projecting into the bushing, an impeller in the chamber fixed on the shaft adjacent the journal, a bearing between the bushing and the shaft, sealing means between the shaft and the bushing end adjacent the impeller, a lubricating system connected with the bearing, and means through which air outside of the casing is drawn into the chamber past the end of sealing means adjacent the chamber.

2. In a supercharger device for engines, a casing having a chamber through which fuel passes to the engine, impeller means in the chamber, an engine rotated shaft in the chamber on which the impeller is fixed, a bushing fixed in the casing adjacent the chamber, a floating bearing sleeve for said shaft in the bushing, means for lubricating the bearing sleeve, sealing means for the shaft arranged in the bushing between the chamber and the bearing sleeve, and duct means connecting the chamber with atmosphere to neutralize the influence of pressure conditions in the chamber upon the lubricating means at the end of the bearing sleeve adjacent the chamber, said duct means including a passage in the casing open to atmosphere and passages in the bushing extending lengthwise thereof connecting the casing passage with the chamber exteriorly of the sealing means.

3. In an engine supercharger device, a casing through which fuel flows to the engine having a wall structure with a journal, a bushing in the journal exposed at one end to the interior of the casing, a drive shaft projecting into the bushing, an impeller in the casing fixed on the shaft adjacent one end of the journal, a lubricated bearing between the shaft and the bushing, sealing means between the bushing and the shaft and between the bearing and the exposed end of the bushing, and air passage means through the casing wall structure and lengthwise through the bushing exteriorly of the sealing means, one end of the bushing passage means communicating with the end of the sealing means exposed to the interior of the casing.

4. In a supercharger device for engines, a casing having a fuel chamber with inlet and outlet portions through which fuel passes, impeller means in the chamber, an engine driven shaft extending through the chamber and having the impeller means fixed thereto, a bushing extending through the wall of the casing at the outlet portion of the chamber, a shaft bearing in the bushing, a lubricating system connected with the bearing, a member fixed on the shaft in said bushing between the chamber and the bearing, sealing rings on the member engaging the bushing, said member having a circumferential recess in the periphery between two of the sealing rings, and duct means through the bushing and the casing wall connecting the recess in the member with atmosphere.

5. In an engine supercharger device, a casing having a chamber through which fuel flows to the engine, said casing having a wall with a journal, a bushing in the wall journal, a drive shaft projecting into the bushing, an impeller in the casing chamber fixed on the drive shaft adjacent one end of the hub journal, a bearing between the bushing and the shaft, a member fixed on the shaft portion in the bushing between the bearing and the impeller, sealing rings on the member engaging the interior wall of the bushing, a lubricating system connected with the bearing, and means through which air from outside the casing is drawn into the casing chamber past the end of the member adjacent the impeller.

6. In an engine supercharger device, a casing through which fuel flows to the engine, a hub structure fixed to the casing, a bushing in the hub structure, a drive shaft in the bushing, an impeller in the casing adjacent the hub structure and fixed on the drive shaft, a member in the bushing fixed on the shaft adjacent the impeller, sealing rings on the member bearing against the bushing, a floating bearing sleeve in the bushing and spaced from the member, an oil outlet chamber in the bushing between the member and the sleeve, means for feeding oil to the bearing sleeve, said bushing having an oil outlet passage communicating with the chamber, and means through which air from the exterior of the casing can be drawn by pressure reduction in the casing to the end of the member adjacent the impeller.

7. In an engine supercharger device, a casing through which fuel flows to the engine, a hub structure fixed in the casing, a bushing in the hub structure having an open end and a closed end, a hollow drive shaft having an open end projecting into the bushing, an impeller in the casing fixed on the drive shaft, a member in the open end portion of the bushing fixed on the shaft, sealing rings on the member bearing against the bushing, a floating bearing sleeve on the shaft adjacent but spaced from the closed end of the bushing, said member being spaced in an axial direction from the bearing sleeve to form an oil outlet chamber in the bushing, said hub structure and bushing having an oil outlet passage communicating with the chamber, said hub having an oil inlet passage adjacent the closed end of the bushing and overlying the end of the floating bearing sleeve, and means through which air from the exterior of the casing can flow from the open end of the bushing to the interior of the casing.

8. In an engine supercharger device, a casing through which fuel flows to the engine, a hub structure fixed in the casing, a bushing in the hub structure having an open end and a closed end, a hollow drive shaft having an open end projecting into the bushing, an impeller in the casing fixed on the drive shaft, a member in the open end portion of the bushing and fixed on the shaft, sealing rings on the member bearing against the bushing, a floating bearing sleeve on the shaft adjacent but spaced from the closed end of the bushing, said member being spaced in an axial direction from the bearing sleeve to form an oil outlet chamber in the bushing, means restricting axial movement of the bearing sleeve, said hub structure and bushing having an oil outlet passage communicating with the chamber, said hub having an oil inlet passage adjacent the closed end of the bushing and overlying the end of the floating bearing sleeve, and means through which air from the exterior of the casing can flow from the open end of the bushing to the interior of the casing.

9. In an engine supercharger device, a casing through which fuel flows to the engine, a hub structure fixed in the casing, a bushing in the hub structure having an open end and a closed end, means forming a passage from the open end of the bushing to the interior of the casing, a hollow drive shaft having an open end projecting into the bushing, an impeller in the casing fixed on the drive shaft, a member in the open end portion of the bushing fixed on the shaft, sealing rings on the member bearing against the bushing, a floating bearing sleeve on the shaft adjacent but spaced from the closed end of the bushing, said member being spaced in an axial direction from the bearing sleeve to form an oil outlet chamber therebetween in the bushing, said hub structure and bushing having an oil outlet passage communicating with the chamber, said hub having an oil inlet passage adjacent the closed end of the bushing and overlying the end of the floating bearing sleeve, said bushing having passages extending in an axial direction connected with the passage at the open end of the bushing, and passage means in the hub structure open to the exterior of the casing and to the passages in the bushing.

10. In an engine supercharger device, a casing through which fuel flows to the engine, a hub structure fixed in the casing having a chamber adjacent one end communicating with the interior of the casing, a bushing fixed in the hub structure having an open end in the chamber and a closed end, a hollow drive shaft having an open end projecting into the bushing and spaced from the closed end, an impeller in the casing fixed on the drive shaft, a member in the open end portion of the bushing and fixed on the shaft, sealing rings on the member bearing against the bushing, a floating bearing sleeve on the shaft adjacent but spaced from the closed end of the bushing, said member being spaced in an axial direction from the bearing sleeve to form an oil outlet chamber therebetween in the bushing, said hub structure and bushing having an oil outlet passage communicating with the chamber, said hub having an oil inlet passage adjacent the closed end of the bushing and overlying the end of the floating bearing sleeve, means through which air from the exterior of the casing can flow to the chamber at the open end of the bushing, pressure means for moving oil through the inlet passage, and means for drawing oil through the outlet passage from the outlet chamber.

11. In an engine supercharger device, a casing through which fuel flows to the engine having a wall with a journal portion, a bushing having a portion fixed in the journal portion and a portion extending exteriorly of the wall, a drive shaft extending through the bushing, an impeller fixed on the shaft in the interior of the casing, a member fixed to the shaft within the bushing portion in the wall having a circumferentially extending peripheral groove therein, sealing rings on the bearing member at each side of the groove engaging the bushing, passage means in the bushing and casing wall connecting the groove in the member with atmosphere, means for feeding oil to the interior of bushing portion extending beyond the wall, and an oil outlet in the bushing portion adjacent the wall.

12. In an engine supercharger device, a casing through which fuel flows to the engine having a wall with a journal portion, a bushing fixed to the wall having a portion in the journal wall portion and a portion extending exteriorly of the wall, a drive shaft extending through the bushing, an impeller in the casing and fixed on the drive shaft, a member fixed to the shaft in the bushing portion in the wall journal, said member having a circumferentially extending groove in its periphery, sealing rings on the member beyond each side of the groove and engaging the adjacent bushing portion, air passage means in the bushing and wall opening to the groove in the member, floating sleeve bearing means between the bushing portion extending beyond the wall and the shaft, and means feeding oil to the floating bearing means, said bushing having an oil outlet chamber in the portion immediately adjacent the wall.

13. In an engine supercharger device, a casing through which fuel flows to the engine having a wall structure with a hub, a bushing in the hub, a drive shaft projecting into the bushing, an impeller in the casing fixed on the shaft adjacent one end of the hub, a member fixed on the shaft portion in the bushing exposed to the interior of the casing, sealing rings on the member engaging the interior wall of the bushing, means feeding oil to and from the end of the member remote from the impeller, air passage means through the casing wall to the end of the member exposed to the interior of the casing, and air filter means at the inlet end of the passage means.

14. In a supercharger device for engines, a casing having spaced aligned bearings therein, a hollow drive shaft mounted in the bearings having the bore at one end portion open and of smaller diameter than the other portion, an impeller in the casing fixed on the shaft, a lubricating system connected with the bearing adjacent the smaller bore portion of the shaft and with the open end of the shaft, and a hollow, relatively lightweight filler member in the larger bore portion of the shaft having a relatively small diameter bore open at the end adjacent the smaller diameter bore portion of the shaft and closed at the other end, said filler member and shaft having communicating radial openings therein through which lubricant can flow from the filler bore to the bearing supporting the larger bore portion of the shaft.

JESSE G. VINCENT.